(12) United States Patent
Kaner et al.

(10) Patent No.: US 7,645,308 B2
(45) Date of Patent: Jan. 12, 2010

(54) OSMIUM DIBORIDE COMPOUNDS AND THEIR USES

(75) Inventors: Richard B. Kaner, Pacific Palisades, CA (US); John J. Gilman, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 589 days.

(21) Appl. No.: 11/578,029

(22) PCT Filed: May 10, 2005

(86) PCT No.: PCT/US2005/016372

§ 371 (c)(1),
(2), (4) Date: Oct. 12, 2006

(87) PCT Pub. No.: WO2005/110924

PCT Pub. Date: Nov. 24, 2005

(65) Prior Publication Data

US 2007/0224100 A1    Sep. 27, 2007

Related U.S. Application Data

(60) Provisional application No. 60/570,320, filed on May 11, 2004.

(51) Int. Cl.
- C09K 3/14 (2006.01)
- B24D 18/00 (2006.01)
- C01B 25/08 (2006.01)
- C01B 35/00 (2006.01)

(52) U.S. Cl. .......................... 51/309; 51/293; 423/289; 423/276

(58) Field of Classification Search .................. 51/309, 51/293; 423/289, 276
See application file for complete search history.

(56) References Cited

U.S. PATENT DOCUMENTS

| 4,745,035 A | 5/1988 | Saurer et al. |
| 6,217,413 B1 | 4/2001 | Christianson |
| 2002/0069592 A1* | 6/2002 | Sherman et al. ............... 51/309 |

OTHER PUBLICATIONS

Bertil Aronsson,The Crystal structure of RuB2, OsB2 and IrB1.35 and some general comments on the Crystal Chemistry of Borides in the compositions range MeB2-MeB3, ACTA Chemica Scandinavica 17 (1963) 2036-2050.*
R.B. Roof et al., "New orthorhombic Phase in the Ru-B and Os-B Systems," J. Chem, Phys., vol. 37, No. 7, Oct. 1, 1962, pp. 1473-1476.
H. Holleck, "Material selection for hard coatings," J. Vac. Sci. Technol. A, vol. 4, No. 6, 1986, pp. 2661-2669.
Supplementary European Search Report for EP 05 74 9821 dated Jun. 26, 2008.
T. W. Choularton, "Clean surface reactions between diamond and steel", Nature, vol. 274, Aug. 24, 1978, pp. 792-193.
C. Li et al., "Correlation of Bulk Modulus and the Constituent Element Properties of Binary Intermetallic Compounds," Chem. Mater., 2001, 13, pp. 4642-4648.
J.M. Leger et al., "Discovery of Hardest known oxide", Nature, vol. 383, Oct. 3, 1996.
S.H. Jhi et al., "Electronic mechanism of hardness enhancement in transition-metal carbonitrides," Nature, vol. 399, May 13, 1999, pp. 132-134.
E. Knittle et al., "Experiment and theoretical equation of state of cubic boron nitride," Nature, vol. 337, Jan. 26, 1989, pp. 349-352.
R. S. Ram et al., "Fourier transform emission spectroscopy and ab initio calculations on OsN," Journal of Chemical Physics, vol. 111, No. 8, Aug. 22, 1999, pp. 3449-3456.
V. V. Brazhkin et al., "Harder than diamond: dreams and reality," Philosophical Magazine A, 2002, vol. 82, No. 2, pp. 231-253.
H. Cynn et al., "Osmium has the Lowest Experimentally Determined Compressibility," The American Physical Society, Physical Review Letters, vol. 88, No. 13, Apr. 1, 2002, pp. 135701-1-135701-4.
A.Y. Liu et al., "Prediction of New Low Compressibility Solids," Science, New Series, vol. 245, No. 4920, Aug. 25, 1989, pp. 841-842.
L. Rao et al., "Rapid synthesis of transition-metal borides by solid-state metathesis," J. Mater. Res., vol. 10, No. 2, Feb. 1995, pp. 353-361.
J. Haines et al., "Synthesis and Design of Superhard Materials," Annual Review of Materials Research, vol. 31, 2001, pp. 1-23.
V.L. Solozhenko et al., "Synthesis of superhard cubic $BC_2N$," Applied Physics Letters, vol. 78, No. 10, Mar. 5, 2001, pp. 1385-1387.
B. Aronsson, "The Crystal Structure of $RuB_{21}$ $OsB_2$ and $IrB_{1.35}$ and Some General Comments on the Crystal Chemistry of Borides in the Composition Range $MeB-MeB_3$," Acta Chem. Scand., vol. 17, No. 7, 1963, pp. 2036-2050.
M.L. Cohen, "Theory of normal and superconducting properties of fullerene-based solids," Materials Science and Engineering, B19, 1993, pp. 111-116.
K. Jacobs et al., "Threshold Size for Ambient Metastability of Rocksalt CdSe Nanocrystals," Journal of Physical Chemistry, vol. 106, No. 15, Apr. 18, 2002, pp. 3759-3762.

* cited by examiner

Primary Examiner—Jerry Lorengo
Assistant Examiner—Shuangyi Abu Ali
(74) Attorney, Agent, or Firm—Venable LLP; Henry J. Daley

(57) ABSTRACT

Osmium, when combined with boron alone, or in combination with rhenium, ruthenium or iron, produces compounds that are ultra-hard and incompressible. These osmium diboride compounds are useful as a substitute to for other super or ultra-hard materials that are used in cutting tools and as abrasives. The osmium diboride compounds have the formula $$Os_xM_{1-x}B_2$$

where M is rhenium, ruthenium or iron and x is from 0.01 to 1, except when x is not 1 and M is rhenium, x is from 0.01 to 0.3.

25 Claims, 2 Drawing Sheets

OSMIUM DIBORIDE COMPOUNDS AND THEIR USES

CROSS-REFERENCE TO RELATED APPLICATION

This application is a national phase of International Application No. PCT/US 2005/016372, filed May 10, 2005, and claiming priority of U.S. Provisional Application No. 60/570,320, filed May 11, 2004, the entire contents of which are incorporated herein by reference.

The U.S. Government has a paid-up license in this invention and the right in limited circumstances to require the patent owner to license others on reasonable terms as provided for by the terms of NSF Grant No. 0073581.

BACKGROUND OF THE INVENTION

1. Field of the Invention

The present invention relates generally to super hard, incompressible materials. More particularly, the invention is directed to the discovery that osmium, when combined with boron alone, or in combination with rhenium, ruthenium or iron, produces compounds that are ultra-hard and incompressible. These osmium diboride compounds are useful as a substitute to for other super or ultra-hard materials that are presently being used in cutting tools and as abrasives.

2. Description of Related Art

The publications and other reference materials referred to herein to describe the background of the invention and to provide additional details regarding its practice are hereby incorporated by reference. For convenience, the reference materials are numerically referenced and identified in the appended bibliography.

High bulk modulus, superhard materials are of great interest due to their usefulness in a wide variety of industrial applications. These include abrasives, cutting tools, and coatings where wear prevention, scratch resistance, surface durability and chemical stability are a priority.[1,2] Therefore, the development of a new class of superhard materials is of great practical interest. Past research suggests the general idea that melting points can be related to hardness and that the addition of carbon, nitrogen, or boron to transition metals will often form hard materials.[3]

Hardness is a measure of a material's resistance to plastic indentation under an applied load. The deformation of the material is manifested through shear deformation, volume compression, bond-bending, and dislocations.[4] A high shear modulus reflects the material's ability to undergo compression without deforming in any direction. This is related to the material's ability to resist volume compression and is reflected in a high bulk modulus.[5,6] Therefore, a design goal is to find a material that possesses a high bulk modulus.[7-9]

The compressibility of a wide variety of substances can be directly correlated with the densities of their valence electrons, electrons/Å$^3$.[10] For example, diamond, the hardest known substance, has a valence electron density of 0.705 electrons/Å$^3$ and an exceptionally high bulk modulus ($B_0$=442 GPa).[11] Maximizing the valence electron density is therefore a potentially useful design parameter in the search for new high bulk modulus materials. Osmium metal has one of the highest valence electron densities for a pure metal (0.511 electrons/Å$^3$) and recent measurements of its bulk modulus give values in the range of 411-462 GPa.[12,13] While one measurement actually suggests that osmium metal is less compressible than diamond, both experiments agree that it is a highly incompressible material. Although the bulk moduli of diamond and osmium are very close, their hardnesses vary greatly due to differences in the mobilities of their dislocations.[5] Diamond has a hardness of 8000-10,000 kg/mm$^2$, while osmium metal has a hardness of only 400 kg/mm$^2$.[14,15] The deviation can be explained simply: osmium is metallic, whereas diamond is purely covalent. The atomic orbitals in diamond are all sp$^3$ hybridized, and overlap to form short, directional, highly covalent bonds in an infinite tetrahedral network. The strength and directionality of the bonds determine the material's ability to resist deformation.[4,8] In contrast, osmium's hexagonally close-packed crystal structure has a Fermi-liquid of valence electrons which do not participate in localized or directional bonding, and therefore offer little resistance to dislocation motion.

While many transition metals are soft in their pure elemental state, they can be converted into hard materials by combining them with small, covalent main group elements such as boron, carbon or nitrogen. For example, consider the third row transition metal tungsten. The hardness of tungsten is increased from 900 kg/mm$^2$ to 1400 kg/mm$^2$ by the addition of boron to form tungsten diboride, WB$_2$. Alternatively, tungsten can be combined with carbon to form tungsten carbide, WC, which increases the hardness to 3000 kg/mm$^2$.[14]

SUMMARY OF THE INVENTION

In accordance with the present invention we demonstrate that valence electron density and bond covalency can be used as specific design parameters for ultra-incompressible, superhard materials. Utilizing these concepts, we incorporated boron atoms into osmium metal to create localized covalent bonding and thus improve its hardness. Other possible compounds include osmium carbides and nitrides. However, attempts to synthesize OsC were unsuccessful and OsN was only recently observed spectroscopically and has not yet been obtained in a crystallographically pure form.[16] Because of boron's small size and electron accepting properties, we were able to combine boron with osmium to form OsB$_2$ which retains nearly all of the high valence electron density of osmium metal. This compound combines a high bulk modulus with high hardness. Although the crystal structure of osmium diboride was known, its mechanical properties were not well characterized.[17,18]

The present invention includes methods for abrading or cutting through the surfaces of materials, which involve contacting the surface of the material with an abrasive that consists essentially of an osmium diboride compound having the formula

where M is rhenium, ruthenium or iron and x is from 0.01 to 1, except when x is not 1 and M is rhenium, x is from 0.01 to 0.3. The materials that can be abraded are those that are not as hard as the osmium diboride compounds. For example, sapphire (hardness of 2000 Kg/mm$^2$) may be abraded, as well as materials having a hardness of 3000 Kg/mm$^2$ or greater depending upon the hardness of the particular osmium diboride compound being used as the abrasive.

The present invention also includes methods for protecting a surface from abrasion or cutting by a material. The method involves coating the surface with a protective layer that includes an osmium diboride compound having the formula

where M is rhenium, ruthenium or iron and x is from 0.01 to 1, except when x is not 1 and M is rhenium, x is from 0.01 to 0.3. The protective layer will provide protection against materials that are not as hard as the osmium diboride compounds as discussed above.

The present invention not only covers the methods for using the osmium diboride compounds, but also covers the tools, abrasives and other devices and systems in which the osmium diboride compounds are used. The osmium diboride compounds may be used in the same manner as known super hard materials, such as diamond, tungsten carbide and the like. The osmium diboride compounds provide the same desirable super hard or ultra-hard properties found in the known super-hard materials, but without many of the drawbacks.

The above discussed and many other features and attendant advantages of the present invention will become better understood by reference to the following detailed description when taken in conjunction with the accompanying drawings.

$$P=(3/2)B_0[(V/V_0)^{-7/3}-(V/V_0)^{-5/3}]\{1-(3/4)(4-B_0')[(V/V_0)^{-2/3}-1]\}$$

Figure 1A:
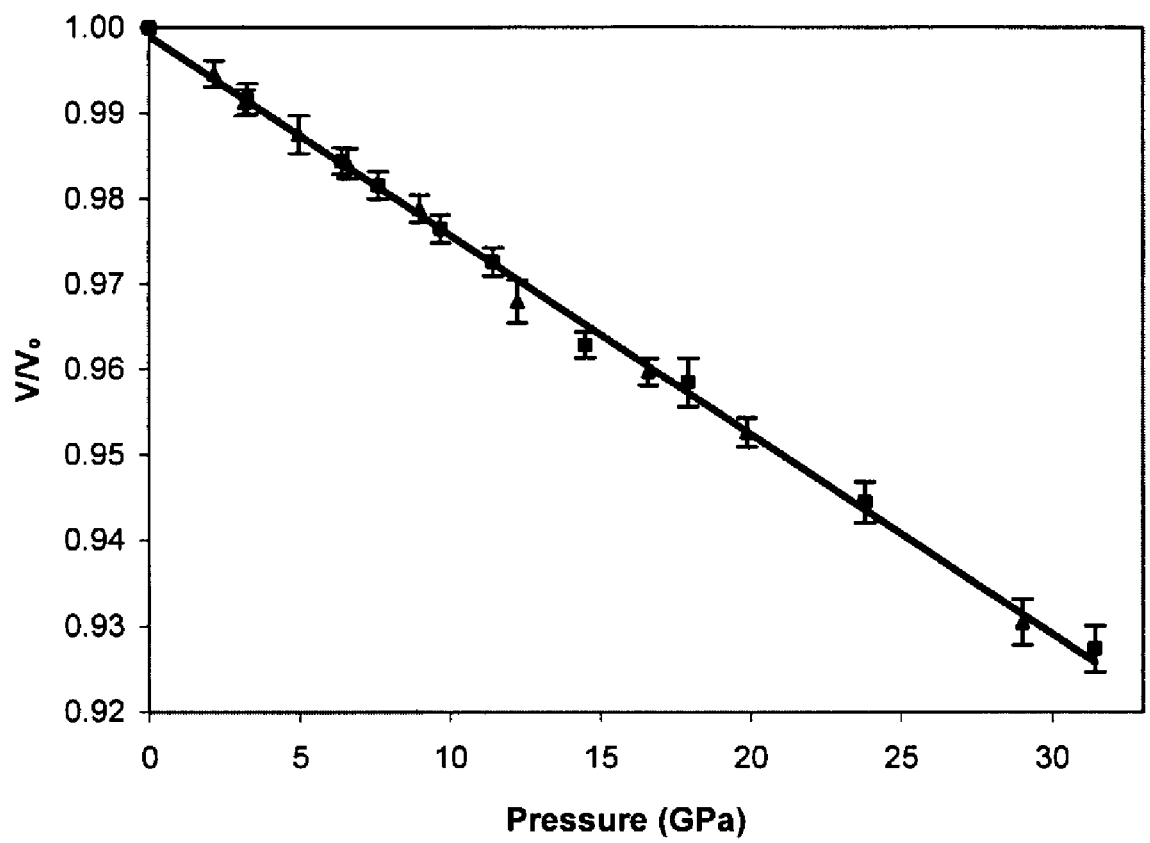
FIG. 1A is a plot of fractional unit cell volume vs. pressure for $OsB_2$. The symbols ■ and ▲ indicate two different experimental runs. These data were fit with the third-order Birch-Murnaghan equation of state.
Figure 1B:
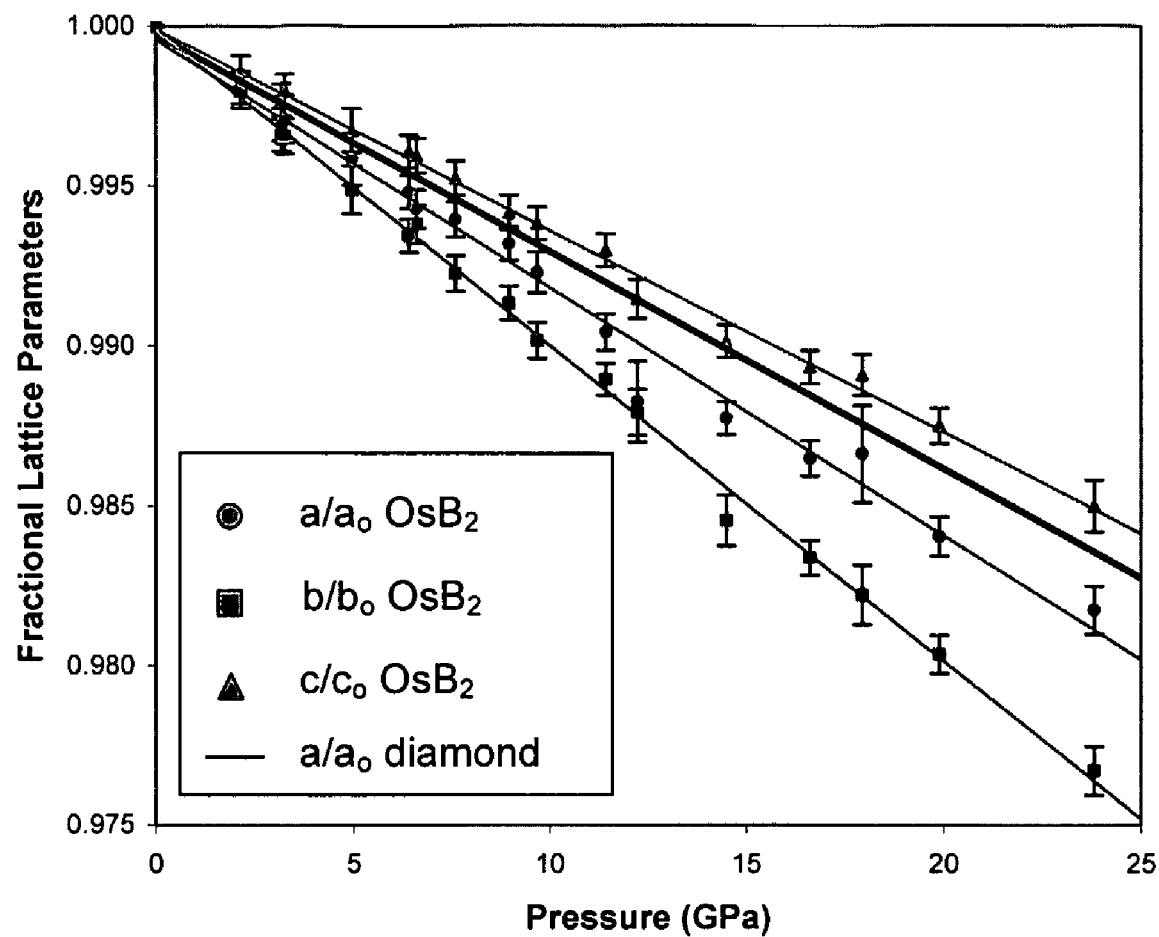

FIG. 1B is a graph showing a comparison of the compressibility of the individual lattice parameters of $OsB_2$ with diamond. The a (squares), b (circles) and c (triangles) parameters in $OsB_2$ are fit to a straight line, while the diamond line (in bold) is taken from Reference 11. Note that the c-axis in $OsB_2$ is less compressible than diamond.

DETAILED DESCRIPTION OF THE INVENTION

We employed two synthetic methods for forming $OsB_2$. In the first method, $MgB_2$ is used as a precursor in solid-state metathesis reactions.[19] The reaction of a 2:3 mixture of $OsCl_3$:$MgB_2$, initiated with a resistively heated nichrome wire, self-propagates and goes to completion in less than one second. After washing away the $MgCl_2$ byproduct salt, X-ray diffraction indicates the formation of $OsB_2$ along with $Os_2B_3$, OsB, and Os. Heating this product with a 3 molar excess of boron at 1000° C. for 3 days yields $OsB_2$ as the only crystalline product. In the second method, a 1:2 molar ratio of Os:B heated at 1000° C. yields a mixture of osmium borides. However, using a 1:5 molar ratio of Os:B, as suggested from our experience with the metathesis reactions, and heating at 1000° C. for 3 days, yields phase pure crystalline $OsB_2$ and amorphous boron. This material was then used to determine both bulk modulus and hardness.

The compressibility of $OsB_2$ was measured using high pressure X-ray diffraction. Diffraction patterns were collected over the range of 0.0001 GPa (ambient pressure) to 32 GPa. Application of high pressures produced remarkably small shifts in peak positions, indicating a small volume compressibility, i.e. a large bulk modulus (B). The data were fit using the third-order Birch-Marnaghan equation of state to calculate both the zero pressure bulk modulus, $B_0$, and its derivative with respect to pressure, $B_0'$ (FIG. 2A)[11,20] The resulting values are $B_0$=395 GPa and $B_0'$=1.4. The value of 395 GPa is exceptionally high, exceeding other superhard materials including boron carbide ($B_4C$, $B_0$=200 GPa), silicon carbide (SiC, $B_0$=248 GPa), sapphire ($Al_2O_3$, $B_0$=252 GPa) and cubic boron nitride (c-BN, $B_0$=367 GPa), and approaching that of diamond ($B_0$=442 GPa).[21] Typical hard materials have a $B_0'$ near 4.[11] This means that most materials become less compressible at high pressures and therefore show curvature in the P vs. V/Vo data. A small $B_0'$, as calculated for $OsB_2$ and as seen for diamond ($B_0'$=1.9), implies that the equation of state remains highly linear despite increasing pressures.[11]

Like the volume of the unit cell of $OsB_2$, the individual axes also change linearly with increasing pressure. However, because the unit cell is not cubic, compression of the axes shows interesting anisotropy (FIG. 1B). The b-direction of the crystal is most compressible, while the c-direction is the least compressible. Remarkably, the compressibility of $OsB_2$ along the c-axis (001) is even less than the analogous linear compressibility of diamond.

This variation in compressibility among the axes can be understood by analysis of the orthorhombic crystal structure of $OsB_2$. In the a- and b-directions, the boron and osmium atoms are arranged in planes that are offset from each other. Upon compression, the boron and osmium atoms are not pushed directly into each other, and therefore the electronic repulsion forces, which maximize incompressibility, are not optimized. In contrast, along the c-direction the boron and osmium atoms are almost directly aligned, resulting in highly repulsive electron interactions. This result implies that higher symmetry borides, where boron is more evenly distributed throughout the crystal lattice, could show more isotropic and potentially higher incompressibilities.

Hardness characterization of $OsB_2$ was done in two ways: a qualitative scratch test, and a nano-indentation test. The Moh's hardness scale ranks the relative hardness of a material based on its ability to scratch another material on a scale of 1-10. Osmium diboride was compared to sapphire, which is a 9 on the Moh's scale (diamond is a 10). A sample of $OsB_2$ powder readily scratches a polished sapphire window. The permanent marks are observable with the naked eye as well as with an optical microscope.

This measurement provides a sense of relative hardness. However, the hardness of sapphire is 2000 kg/mm$^2$ and the hardness of diamond is 8000-10,000 kg/mm$^2$.[15] There is significant variation between these values, and therefore between 9 and 10 on the Moh's hardness scale. To obtain a more accurate hardness value of $OsB_2$, it is necessary to make more direct, quantitative measurements.

Nanoindentation measurements were thus performed on $OsB_2$. To do these experiments with our powdered samples, $OsB_2$ was first embedded in a hard epoxy resin support matrix. The surface was then polished using a diamond polisher to reveal flat crystal faces of $OsB_2$. A nano-sized diamond-tipped indenter was lowered onto the sample with a known force and data on the load applied and indentation depth were collected during loading and unloading. Hardness was then determined from the unloading depth of the indenter. The unloading curve allows for separation of the plastic deformation of the sample from the sample elastic deformation. Unfortunately, because the epoxy resin also plastically deforms during indentation, the unloading curve does not purely represent the deformation of the $OsB_2$ sample. Therefore, the hardness value obtained from this measurement represents a lower limit of the true hardness of the material. From this experiment, a Vicker's Hardness, $H_v$=3100 kg/mm$^2$ was obtained. This corroborates the data obtained from the scratch test, where $OsB_2$ scratched sapphire, which has a Vicker's Hardness of 2000 kg/mm$^2$.[16]

The measured incompressibility and hardness of $OsB_2$ demonstrate that it is possible to apply design parameters for the synthesis of highly incompressible and superhard materials. By combining small, light, main-group elements with large, electron-rich transition metals, it is possible to build in covalency while maintaining extremely high electron density. Like osmium, rhenium also has a high electron density, and preliminary experiments indicate that $ReB_2$ also has a high bulk modulus. Because hardness is known to increase when two dissimilar phases are intermixed, it is possible to exceed the bulk modulus and hardness of either $OsB_2$ or $ReB_2$ with a solid solution between Os and Re, i.e. $Os_{1-x}Re_xB_2$. Given the possible atomic permutations that follow the concepts presented here, it is likely that other combinations will produce osmium diboride compounds with even more impressive mechanical properties than $OsB_2$.

For example, solid solutions having the formula $Os_xRe_{1-x}B_2$ where x ranges from 0.01 to 0.30 are possible. These solid solutions are made using known procedures where the appropriate amounts of the various ingredients are mixed together and heated to temperatures of less than 2500° C. Solid solutions are also possible having the formula $Os_xRu_{1-x}B_2$ where x ranges from 0.01 to 0.99. These ultra hard materials that use Ru in place of Re are made using the same basic procedures for making solid solutions which are known in the art. The synthesis procedure typically involves using electrical arc heating.

Using an arc-melting apparatus enables the synthesis of transition metal diboride solid solutions including $(Os,Ru)B_2$, $(Os,Fe)B_2$, $(Fe,Ru)B_2$ and $(Os,Re)B_2$. By applying relatively large currents (80-120 amps) at a high potential (30 volts) to samples comprised of transition metals and boron precursors in an arc melter, temperatures far exceeding their melting points (>2500° C.) can readily be achieved in seconds. Subsequent rapid cooling back to ambient temperature leads to true solid solutions. For example, a diboride solid solution between osmium and ruthenium, i.e. $(Os,Ru)B_2$, can be made by combining stoichiometric amounts of each element, grinding them with a pestle in a mortar and then pressing this powder into a pellet using a pellet press. After loading the pellet in the arc melter, the apparatus is evacuated and then backfilled with an inert gas such as argon. Current is applied via an electrode to create an arc. The current is increased until the pellet melts which generally takes only a few seconds. The water-cooled copper plate on which the pellet sits rapidly brings the sample back to ambient temperature once the current is turned off. A complete range of $(Os,Ru)B_2$ solid solutions have been made. Analogously, $(Os,Fe)B_2$ and $(Fe,Ru)B_2$ solid solutions can be made. For the Os/Re boride system we have been able to incorporate up to 30 mol % Os into $ReB_2$, i.e. $Os_{0.3}Re_{0.7}B_2$, but we cannot incorporate even 10 mol % Re into the OsB2 structure. This is most likely due to the different crystal structures of $OsB_2$ (orthorhombic) and $ReB_2$ (hexagonal). However, since Os and Ru have similar structures they can be combined in essentially any ratio, such as a 50/50 Os/Ru mixture, i.e. $Os_{0.5}Ru_{0.5}B_2$. Experiments indicate that iron can be incorporated into both $OsB_2$ and $RuB_2$ even though pure $FeB_2$ is unknown.

The above groups of compounds, which include osmium and boron alone, or in combination with ruthenium, rhenium or iron are referred to herein as osmium diboride compounds. These compounds have the formula $$Os_xM_{1-x}B_2$$

where M is rhenium, ruthenium or iron and x is from 0.01 to 1, except when x is not 1 and M is rhenium, x is from 0.01 to 0.3. Iridium, Rhodium or Cobalt may be partially substituted for Os, if desired. To fall within the invention the diboride compounds must have a hardness that is equivalent to or greater than osmium diboride. That is, the hardness should be on the order of 3000 Kg/mm² or greater.

An example of practice is as follows: a metathesis reaction using a 2:3 molar mixture of $OsCl_3$:$MgB_2$ was initiated with a resistively heated nichrome wire.[19] The reaction (Equation 1) goes to completion in less than one second.

$$2\ OsCl_3 + 3\ MgB_2 \rightarrow 2\ OsB_2 + 3\ MgCl_2 + 2\ B \qquad [1]$$

After washing away the $MgCl_2$ byproducts, X-ray diffraction indicated the formation of $OsB_2$ along with $Os_2B_3$, OsB, and Os. Heating this product in a sealed, evacuated quartz tube with a 3 molar excess of boron at 1000° C. for 3 days yields $OsB_2$. In a second method, a 1:2 molar ratio of Os:B heated at 1000° C. in a sealed, evacuated quartz tube yields a mixture of osmium borides. However, using a 1:5 molar ratio of Os:B and heating at 1000° C. for 3 days yields $OsB_2$ as the only crystalline phase as given in Equation 2.

$$Os + 5B \rightarrow OsB_2 + 3B \qquad [2]$$

$OsB_2$ can also be formed by high temperature arc melting.[17]

Compressibility of $OsB_2$ was studied using high pressure X-ray diffraction. Angle-dispersive powder diffraction patterns were collected on beamline 7.3.3 at the Advanced Light Source, Lawrence Berkeley National Laboratories using an Image plate. An X-ray wavelength of 1.15 Angstroms was chosen to avoid the $L_3$ absorption edge of osmium. Ethylcyclohexane was used as the hydrostatic pressure medium and ruby fluorescence was used to determine the pressure.[22]

Nanoindentation measurements were made using a Micro Photonics Inc. Nano Hardness Tester. $OsB_2$ particles were embedded in a relatively hard resin (Omegabond 200). A surface of this sample was then polished using a diamond polisher to expose an $OsB_2$ crystal surface. A nanometer-sized diamond indenter tip was lowered onto individual crystals of $OsB_2$ with a known, controlled force. The depth of indentation was monitored during the time that the load was applied and released. Analysis of the loading and unloading curve obtained allows separation of elastic and plastic deformation of the material.

The osmium diboride compounds may be used in the same manner as other super hard material as a protective surface coating, a cutting or abrading tool surface coating or as an abrasive. Once prepared, the osmium diboride compounds are incorporated with suitable binders or otherwise attached to the tool surface according to known techniques for applying super hard materials to surfaces. When the osmium diboride compounds are being used as an abrasive powder, the sizes of the crystals may be varied according to well-known abrasion procedures that employ super hard compounds. In general, the osmium diboride compounds may be substituted in place of diamond, tungsten carbide or other super hard material for those applications involving cutting, abrasion (polishing) and protection.

Having thus described exemplary embodiments of the present invention, it should be noted by those skilled in the art that the within disclosures are exemplary only and that various other alternatives, adaptations and modifications may be made within the scope of the present invention.

BIBLIOGRAPHY

1. V. L. Solozhenko, D. Andrault, G. Fiquet, M. Mezouar, D. C. Rubie, *Applied Physics Letters* 78, 1385-1387 (2001).
2. A. G. Thornton, J. Wilks, *Nature* (London, United Kingdom) 274, 792-3 (1978).

3. V. V. Brazhkin, A. G. Lyapin, R. J. Hemley, *Philosophical Magazine A: Physics of Condensed Matter: Structure, Defects and Mechanical Properties* 82, 231-253 (2002).
4. J. Haines, J. M. Leger, G. Bocquillon, *Annual Review of Materials Research* 31, 1-23 (2001).
5. J. J. Gilman, *Electronic Basis of the Strength of Materials* (2003).
6. S.-H. J. I. L. Jhi, S. G.; Cohen, M. L., *Nature* (London, United Kingdom) 399, 132-134 (1999).
7. M. L. Cohen, *Nature* (London, United Kingdom) 338, 291-292 (1989).
8. M. L. Cohen, *Science* (Washington, D.C., United States) 261, 307-308 (1993).
9. A. Y. Liu, M. L. Cohen, *Science* (Washington, D.C., United States) 245, 841-2 (1989).
10. C. Li, P. Wu, *Chemistry of Materials* 13, 4642-4648 (2001).
11.. I. V. Aleksandrov, A. F. Goncharov, A. N. Zisman, S. M. Stishov, *Zhurnal Eksperimental'noi i Teoreticheskoi Fiziki* 93, 680-91 (1987).
12. H. Cynn, J. E. Klepeis, C.-S. Yoo, D. A. Young, *Physical Review Letters* 88, 135701/1-135701/4 (2002).
13. F. A. Occelli, C. M.; Hanfland, M.; Canny, B.; Couzinet, B.; Teter, D. M.; Badro, J.; Farber, D. L., *Physical Review Letters* (in press).
14. J. F. A. Shackleford, W., *CRC Handbook of Materials Science & Engineering* (Boca Raton: CRC Press, 2001).
15. R. Riedel, Editor, *Handbook of Ceramic Hard Materials* (2000).
16. R. S. Ram, J. Lievin, P. F. Bernath, *Journal of Chemical Physics* 111, 3449-3456 (1999).
17. B. Aronsson, *Acta Chem. Scand.* 17, 2036-50 (1963).
18. R. B. Roof, Jr., C. P. Kempter, *Journal of Chemical Physics* 37, 1473-6 (1962).
19. L. Rao, E. G. Gillan, R. B. Kaner, *Journal of Materials Research* 10, 353-61 (1995).
20. S. a. M. Yasuhiko, M., *High-Pressure Research: Application to Earth and Planetary Sciences* (1992).
21. J. M. Leger et al., *Nature* (London) 383, 401 (1996).
22. K. Jacobs, J. Wickham, A. P. Alivisatos, *Journal of physical Chemistry B* 106, 3759-3762 (2002).

What is claimed is:

1. A method for abrading a surface of a material, said method comprising the step of contacting the surface of said material with an abrasive that consists essentially of an osmium diboride compound having the formula $$Os_xM_{1-x}B_2$$

where M is ruthenium or iron and x is from 0.01 to 0.99, or M is rhenium and x is from 0.01 to 0.3.

2. A method for abrading the surface of a material according to claim 1 wherein M is ruthenium.

3. A method for abrading the surface of a material according to claim 1 wherein M is rhenium.

4. A method for abrading the surface of a material according to claim 1 wherein said material has a Vicker's Hardness of 2000 Kg/mm$^2$ or more.

5. A method for abrading the surface of a material according to claim 1 wherein said material has a Vicker's Hardness of 3000 Kg/mm$^2$ or more.

6. A method for protecting a surface from abrasion or cutting by a material, said method comprising the step of coating said surface with a protective layer that comprises an osmium diboride compound having the formula $$Os_xM_{1-x}B_2$$

where M is ruthenium or iron and x is from 0.01 to 0.99, or M is rhenium and x is from 0.01 to 0.3.

7. A method for protecting a surface from abrasion or cutting according to claim 6 wherein M is ruthenium.

8. A method for protecting a surface from abrasion or cutting according to claim 6 wherein M is rhenium.

9. A method for protecting a surface from abrasion or cutting according to claim 6 wherein said material has a Vicker's Hardness of 2000 Kg/mm$^2$ or more.

10. A method for protecting a surface from abrasion or cutting wherein said material has a Vicker's Hardness of 3000 Kg/mm$^2$ or more.

11. A tool for use in cutting through a material or abrading a surface of said material, said tool comprising a tool surface which comprises an osmium diboride compound having the formula $$Os_xM_{1-x}B_2$$

where M is ruthenium or iron and x is from 0.01 to 0.99, or M is rhenium and x is from 0.01 to 0.3.

12. A tool according to claim 11 wherein M is ruthenium.

13. A tool according to claim 11 wherein M is rhenium.

14. A tool according to claim 11 wherein said material has a Vicker's Hardness of 2000 Kg/mm$^2$ or more.

15. A tool according to claim 11 wherein said material has a Vicker's Hardness of 3000 Kg/mm$^2$ or more.

16. A surface that comprises a protective coating for protecting said surface from abrasion or cutting by a material, said protective coating comprising an osmium diboride compound having the formula $$Os_xM_{1-x}B_2$$

where M is ruthenium or iron and x is from 0.01 to 0.99, or M is rhenium and x is from 0.01 to 0.3.

17. A surface according to claim 16 wherein M is ruthenium.

18. A surface according to claim 16 wherein M is rhenium.

19. A surface according to claim 16 wherein said material has a Vicker's Hardness of 2000 Kg/mm$^2$ or more.

20. A surface according to claim 16 wherein said material has a Vicker's Hardness of 3000 Kg/mm$^2$ or more.

21. A composition of matter, consisting essentially of osmium, boron and at least one element selected from the group of elements consisting of rhenium, ruthenium and iron, wherein said composition satisfies the formula $$Os_xM_{1-x}B_2$$

where M is ruthenium or iron and x is from 0.01 to 0.99, or M is rhenium and x is from 0.01 to 0.3.

22. A composition according to claim 21, wherein M is ruthenium.

23. A composition according to claim 21, wherein M is rhenium.

24. A composition according to claim 21, wherein said composition has a Vicker's Hardness of 2000 Kg/mm$^2$ or more.

25. A composition according to claim 21, wherein said composition has a Vicker's Hardness of 3000 Kg/mm$^2$ or more.

* * * * *

UNITED STATES PATENT AND TRADEMARK OFFICE
CERTIFICATE OF CORRECTION

PATENT NO. : 7,645,308 B2  Page 1 of 1
APPLICATION NO. : 11/578029
DATED : January 12, 2010
INVENTOR(S) : Kaner et al.

It is certified that error appears in the above-identified patent and that said Letters Patent is hereby corrected as shown below:

At column 1, lines 12-15, replace the paragraph with the following:

This invention was made with Government support of Grant No. 0073581 awarded by the National Science Foundation. The Government has certain rights in this invention.

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,645,308 B2 | Page 1 of 1 |
| APPLICATION NO. | : 11/578029 | |
| DATED | : January 12, 2010 | |
| INVENTOR(S) | : Richard B. Kaner et al. | |

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 681 days.

Signed and Sealed this

Twenty-second Day of June, 2010

David J. Kappos
*Director of the United States Patent and Trademark Office*